(12) United States Patent
Kohda

(10) Patent No.: US 11,256,027 B2
(45) Date of Patent: Feb. 22, 2022

(54) OPTICAL FIBER GLASS ECCENTRICITY MEASUREMENT DEVICE AND MEASUREMENT METHOD

(71) Applicant: SUMITOMO ELECTRIC INDUSTRIES, LTD., Osaka (JP)

(72) Inventor: Hiroshi Kohda, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/760,141

(22) PCT Filed: Nov. 1, 2018

(86) PCT No.: PCT/JP2018/040643
§ 371 (c)(1),
(2) Date: Apr. 29, 2020

(87) PCT Pub. No.: WO2019/088216
PCT Pub. Date: May 9, 2019

(65) Prior Publication Data
US 2020/0257043 A1    Aug. 13, 2020

(30) Foreign Application Priority Data
Nov. 1, 2017   (JP) .............................. JP2017-211691

(51) Int. Cl.
*G02B 6/02*   (2006.01)
*G01B 11/24*  (2006.01)
(Continued)

(52) U.S. Cl.
CPC ...... *G02B 6/02395* (2013.01); *G01B 11/2408* (2013.01); *G01B 11/25* (2013.01); *G02B 6/4298* (2013.01)

(58) Field of Classification Search
CPC ................................................ G02B 6/02395
See application file for complete search history.

(56) References Cited

U.S. PATENT DOCUMENTS 5,289,265 A   2/1994 Inoue et al.
5,768,401 A   6/1998 Csipkes et al.
(Continued)

FOREIGN PATENT DOCUMENTS

JP   S62-197738 A   9/1987
JP   H04-315939 A   11/1992
(Continued)

*Primary Examiner* — Sung H Pak
(74) *Attorney, Agent, or Firm* — Faegre Drinker Biddle & Reath LLP

(57) ABSTRACT

Provided is a glass eccentricity measurement device which includes an irradiation unit that irradiates a side surface of a coated glass fiber obtained by coating the striated glass with light, and a light receiving unit that receives light scattered and/or refracted following irradiation of the side surface of the coated glass fiber therewith, and measures an eccentricity of the glass in the coated glass fiber by a pattern of brightness and darkness in the light received by the light receiving unit, in which three or more sets including the irradiation unit and a screen are provided around the coated glass fiber, and the sets are arranged respectively in directions having different angles on a circumference centered on the coated glass fiber.

10 Claims, 11 Drawing Sheets

(51) Int. Cl.
*G01B 11/25* (2006.01)
*G02B 6/42* (2006.01)

(56) References Cited

U.S. PATENT DOCUMENTS

| | | | | |
|---|---|---|---|---|
| 6,285,451 B1 * | 9/2001 | Herron | ............... | G01B 11/06 250/559.27 |
| 2019/0049372 A1 | 2/2019 | Kohda et al. | | |

FOREIGN PATENT DOCUMENTS

| | | |
|---|---|---|
| JP | H04-318437 A | 11/1992 |
| JP | H04-319642 A | 11/1992 |
| JP | H05-087681 A | 4/1993 |
| JP | H05-107046 A | 4/1993 |
| JP | H08-005504 A | 1/1996 |
| JP | H09-126725 A | 5/1997 |
| JP | H10-010005 A | 1/1998 |
| JP | H10-508946 A | 9/1998 |
| WO | WO-96-016314 A1 | 5/1996 |
| WO | WO-2015-107440 A1 | 7/2015 |
| WO | WO-2017-164402 A1 | 9/2017 |

\* cited by examiner

OPTICAL FIBER GLASS ECCENTRICITY MEASUREMENT DEVICE AND MEASUREMENT METHOD

TECHNICAL FIELD

The present disclosure relates to an optical fiber glass eccentricity measurement device and a measurement method.

This application claims priority based on Japanese Patent Application No. 2017-211691 filed on Nov. 1, 2017, the content of which is hereby incorporated by reference into this application.

BACKGROUND ART

Patent Literatures 1 to 4 describe, as related arts, a method of measuring the thickness deviation by irradiating a side face of a coated optical fiber to be drawn with a laser beam from a laser light source and detecting a forward scattered light pattern thereof.

CITATION LIST

Patent Literature

[Patent Literature 1]: Japanese Unexamined Patent Publication: JP-A-4-315939
[Patent Literature 2]: Japanese Unexamined Patent Publication: JP-A-4-319642
[Patent Literature 3]: Japanese Unexamined Patent Publication: JP-A-5-107046
[Patent Literature 4]: Japanese Unexamined Patent Publication: JP-A-5-87681

SUMMARY OF INVENTION

An optical fiber glass eccentricity measurement device according to one aspect of the present disclosure includes
an irradiation unit that irradiates with light a side surface of an optical fiber including a coating layer coated on a striated glass, and
a light receiving unit that receives light scattered and/or refracted following irradiation of the side surface of the optical fiber therewith, and
is a glass eccentricity measurement device for measuring the eccentricity of the glass in the optical fiber based on patterns of brightness and darkness in the light received by the light receiving unit, in which
three or more sets each including the irradiation unit and the light receiving unit are provided around the optical fiber, and
the sets are arranged in directions having different angles on a circumference centered on the optical fiber.

Further, an optical fiber glass eccentricity measurement method according to an aspect of the present disclosure includes
an irradiation step of irradiating a side surface of an optical fiber including a coating layer coated on a striated glass with light from three or more directions having different angles on a circumference centered on the optical fiber,
a light receiving step of receiving light scattered and/or refracted following irradiation of the side surface of the optical fiber therewith from the three or more directions, and
a measuring step of measuring the eccentricity of the glass in the optical fiber based on patterns of brightness and darkness in the received light.

DESCRIPTION OF EMBODIMENTS

Figure 1:
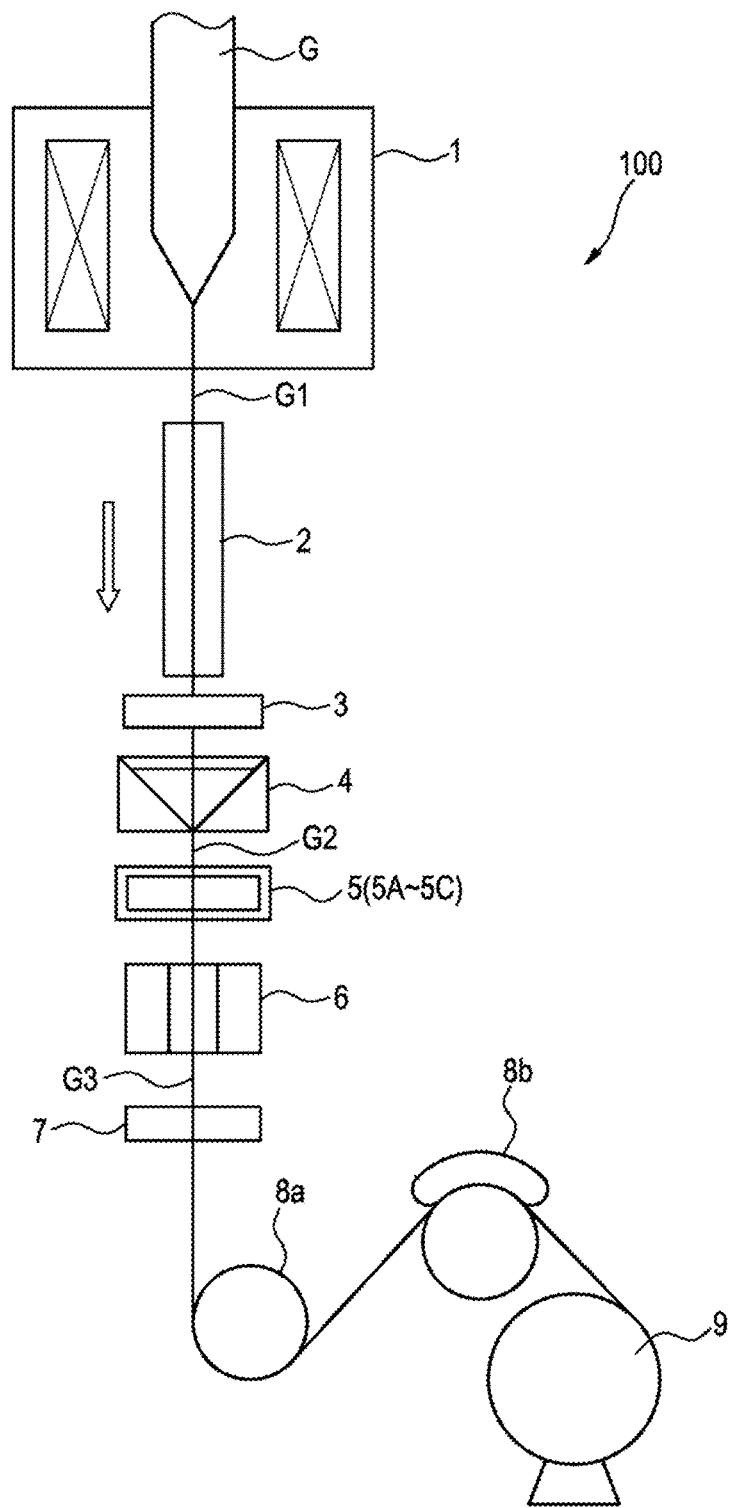
FIG. 1 is a diagram showing an example of an optical fiber drawing apparatus.

Technical Problem to be Solved by Present Disclosure

For example, the eccentricity of the glass of an optical fiber can be detected as follows by using the thickness deviation measurement methods of Patent Literatures 1 to 4. First, with respect to a side surface of an optical fiber including a coating layer coated on a striated glass, the optical fiber is irradiated with laser light from two directions (X and Y directions) perpendicular to each other. Then, from the obtained laser light refraction image, the eccentric state of the glass with respect to the coating is detected based on the asymmetry of the pattern of brightness and darkness corresponding to the glass surface.

In recent years, it has been required to reduce the diameter of the optical fiber. In some cases, the coating outer diameter of the optical fiber is reduced by reducing the thickness of the coating while keeping the conventional glass diameter. In this case, since the difference between the glass diameter and the coating outer diameter is small, the laser light incident on the coating is not totally reflected on the glass surface, and the pattern of brightness and darkness in the light obtained by irradiating the optical fiber with the laser light as described above may disappear. In this case, the eccentric state of the glass in the optical fiber cannot be detected.

An object of the present disclosure is to provide an optical fiber glass eccentricity measurement device and a measurement method, capable of detecting an eccentric state of the glass even when the difference between the glass diameter and the coating outer diameter is small.

Advantageous Effects of Present Disclosure

According to the optical fiber glass eccentricity measurement device and measurement method of the present disclosure, the eccentricity state of glass can be detected even when the difference between the glass diameter and the coating outer diameter is small.

Description of Embodiments of Present Disclosure

First, embodiments of the present disclosure will be listed and described.

An optical fiber glass eccentricity measurement device according to an aspect of the present disclosure includes:

(1) an irradiation unit that irradiates with light a side surface of an optical fiber including a coating layer coated on a striated glass; and a light receiving unit that receives light scattered and/or refracted following irradiation of the side surface of the optical fiber therewith, and is a glass eccentricity measurement device for measuring the eccentricity of the glass in the optical fiber based on patterns of brightness and darkness in the light received by the light receiving unit, in which three or more sets each including the irradiation unit and the light receiving unit are provided around the optical fiber, and the sets are respectively arranged in directions having different angles on a circumference centered on the optical fiber.

According to the above configuration, since three or more sets each including the irradiation unit and the light receiving unit are arranged in directions having different angles on a circumference centered on the optical fiber, even if the pattern of brightness and darkness in the light received in a certain direction disappears, the eccentricity of the glass can be detected from the patterns of brightness and darkness in the light received in the other two or more directions. Thus, even when the difference between the glass diameter and the coating outer diameter is small, the eccentricity of the glass can be detected.

(2) The sets may be arranged in directions that are equiangular on the circumference centered on the optical fiber.

According to the above configuration, since the side surface of the optical fiber can be irradiated with light from three or more directions that are equiangular on the circumference, the sets can be efficiently covered with each other so that an area in which the pattern of brightness and darkness disappears and the eccentricity cannot be grasped is not formed.

(3) A first irradiation unit and a second irradiation unit, each of which is one of the irradiation units, may be arranged at positions facing each other with the optical fiber interposed therebetween, and the first irradiation unit and the second irradiation unit may be each a light emitting unit.

According to the above configuration, even if the pattern of brightness and darkness caused by the light emitted from one of the first and second irradiation units disappears, the eccentricity in the direction orthogonal to the irradiation direction of the first or second irradiation unit can be grasped by viewing the pattern of brightness and darkness caused by the light emitted from the other irradiation units arranged at positions facing each other with the optical fiber interposed therebetween.

(4) A first irradiation unit and a second irradiation unit, each of which is one of the irradiation units, may be arranged at positions facing each other with the optical fiber interposed therebetween, the first irradiation unit may be a light emitting unit, and the second irradiation unit may be a reflection mirror that reflects light emitted from the light emitting unit, in which the light reflected by the reflection mirror may be used as irradiation light and a side surface of the optical fiber may be irradiated with the irradiation light.

According to the above configuration, the number of light emitting units can be reduced, and the cost of the glass eccentricity measurement device can be reduced.

(5) On the circumference centered on the optical fiber, an arc-shaped reflection unit along the circumference centered on the optical fiber may be further provided at a position facing the second irradiation unit, a first light receiving unit and a second light receiving unit, each of which is one of the light receiving units, may be arranged side by side along the axial direction of the optical fiber at the same angular position on the circumference centered on the optical fiber, the first light receiving unit may be a light receiving unit that receives the light scattered and/or refracted following direct irradiation of a side surface of the optical fiber therewith from the first irradiation unit, and the second light receiving unit may be a light receiving unit that receives the light scattered and/or refracted following the irradiation of the side surface of the optical fiber with the irradiation light by the second irradiation unit and then further reflected by the reflection unit.

According to the above configuration, since the first light receiving unit and the second light receiving unit are arranged side by side along the axial direction of the optical fiber, the light patterns of brightness and darkness formed on the two light receiving units can be easily compared.

Further, an optical fiber glass eccentricity measurement method according to an aspect of the present disclosure includes (6) an irradiation step of irradiating a side surface of an optical fiber including a coating layer coated on a striated glass with light from three or more directions having different angles on a circumference centered on the optical fiber, a light receiving step of receiving the light scattered and/or refracted following irradiation of the side surface of the optical fiber therewith from the three or more directions, and a measuring step of measuring the eccentricity of the glass in the optical fiber based on the pattern of brightness and darkness in the received light.

According to the above method, even if the pattern of brightness and darkness in the light received in a certain direction disappears, the eccentricity of the glass can be detected from the patterns of brightness and darkness in the light received in the other two or more directions. Thus, even when the difference between the glass diameter and the coating outer diameter is small, the eccentricity of the glass can be detected.

(7) In the irradiation step, the light may be emitted from three or more directions that are equiangular on the circumference centered on the optical fiber.

According to the above method, since the side surface of the optical fiber can be irradiated with light from three or more directions that are equiangular on the circumference, the sets can be efficiently covered with each other so that an area in which the pattern of brightness and darkness disappears and the eccentricity cannot be grasped is not formed.

(8) The irradiation step may be a step of irradiating a side surface of the optical fiber with light from four directions by irradiating the side surface of the optical fiber with light respectively from two first irradiation units and two second irradiation units, in which the two first irradiation units are arranged in directions having different angles on the circumference centered on the optical fiber, two second irradiation units are arranged at positions facing each other with the optical fiber interposed therebetween, the first irradiation unit and the second irradiation unit are each a light emitting unit, and in the light receiving step, the light scattered and/or refracted following irradiation of the side surface of the optical fiber therewith from the four directions may be received.

According to the above method, even if the pattern of brightness and darkness caused by the light emitted from one of the first and second irradiation units disappears, the eccentricity in the direction orthogonal to the irradiation direction of the first or second irradiation unit can be grasped by viewing the patterns of brightness and darkness caused by the light emitted from the other irradiation units arranged at positions facing each other with the optical fiber interposed therebetween.

(9) The irradiation step may be a step of irradiating a side surface of the optical fiber with light from four directions by irradiating the side surface of the optical fiber with light respectively from two first irradiation units arranged in directions having different angles on the circumference centered on the optical fiber and two second irradiation units arranged at positions facing each other with the optical fiber interposed therebetween, in which the first irradiation unit may be a light emitting unit, and the second irradiation unit may be a reflection mirror that reflects the light emitted from the light emitting unit, and in the light receiving step, the light scattered and/or refracted following irradiation of the side surface of the optical fiber therewith from the four directions may be received.

According to the above method, even if there are two light emitting units, the side surface of the optical fiber can be irradiated with light from four directions. Thereby, the cost of the glass eccentricity measurement device can be reduced.

(10) In the light receiving step, light may be received respectively by two first light receiving units that respectively receive the light scattered and/or refracted following direct irradiation of the side surface of the optical fiber therewith from the two first irradiation units, and two second light receiving units that respectively receive the light scattered and/or refracted following direct irradiation of the side surface of the optical fiber therewith from the two second irradiation units, and further reflected by two arc-shaped reflection units which are respectively arranged at positions facing the second irradiation units on the circumference centered on the optical fiber and are along the circumference centered on the optical fiber, in which the first light receiving unit and the second light receiving unit may be arranged side by side along the axial direction of the optical fiber at the same angular position on the circumference centered on the optical fiber.

According to the above method, since the first light receiving unit and the second light receiving unit are arranged side by side along the axial direction of the optical fiber, the light patterns of brightness and darkness formed on the two light receiving units can be easily compared.

Details of Embodiment of Present Disclosure

Specific examples of the optical fiber glass eccentricity measurement device and the optical fiber glass eccentricity measurement method according to embodiments of the present disclosure will be described below with reference to the drawings.

The present disclosure is not limited to these exemplifications, but is indicated by the appended claims, and is intended to include all modifications within the meaning and scope equivalent to the appended claims.

FIG. 1 is a diagram showing an example of an optical fiber manufacturing apparatus equipped with an optical fiber glass eccentricity measurement device. As shown in FIG. 1, an optical fiber manufacturing apparatus 100 includes a heating furnace 1 for heating an optical fiber base material G on an upstream side in a running line of the optical fiber. The upper part of the optical fiber base material G is gripped by a feeding device and fed into the heating furnace 1 such that the lower end portion thereof is located in the heating area of the heating furnace 1. The lower end side of the optical fiber base material G is heated and softened in the heating area, and is stretched downward to be reduced in diameter to form a glass fiber G1.

On the downstream side of the heating furnace 1, for example, a cooling device 2 using a cooling solvent such as helium gas is provided, and the glass fiber G1 is rapidly cooled from several hundred degrees Celsius to near room temperature. On the downstream side of the cooling device 2, a glass diameter measurement device 3 for measuring the diameter of the glass fiber G1 is provided.

A coating die 4 is provided on the downstream side of the glass diameter measurement device 3, and an ultraviolet curable resin is applied to the outer periphery of the glass fiber G1 that has passed through the coating die 4. A glass eccentricity measurement device 5 is provided on the downstream side of the coating die 4, and the glass fiber G1 coated with an ultraviolet curable resin (hereinafter, referred to as a coated glass fiber G2) passes through the glass eccentricity measurement device 5, and thus the eccentricity of the glass fiber G1 with respect to the ultraviolet curable resin (coating) is measured.

The glass eccentricity measurement device 5 may be immediately after the coating die 4 as described above or may be after an ultraviolet irradiation device 6 described later. In the latter case, the coating is cured and shrunk by being irradiated with ultraviolet rays to make it difficult to measure the state of thickness deviation. However, since the resin is cured and then enters the apparatus, there is an advantage that the glass eccentricity measurement device 5 is hardly stained. On the other hand, in the former case, although the glass eccentricity measurement device 5 is easily stained, there is an advantage that the state of thickness deviation can be easily measured.

The ultraviolet irradiation device 6 is provided on the downstream side of the glass eccentricity measurement device 5, and the resin is cured by passing the coated glass fiber G2 through the ultraviolet irradiation device 6 to form an optical fiber G3 with a coating layer formed around the striated glass. A coating diameter measurement device 7 is provided on the downstream side of the ultraviolet irradiation device 6, and the outer diameter of the optical fiber G3 passing through the coating diameter measurement device 7 is measured.

The optical fiber G3 is taken up by a capstan 8b via a guide roller 8a provided on the downstream side of the coating diameter measurement device 7 and wound up on a reel 9.

First Embodiment

Figure 2:
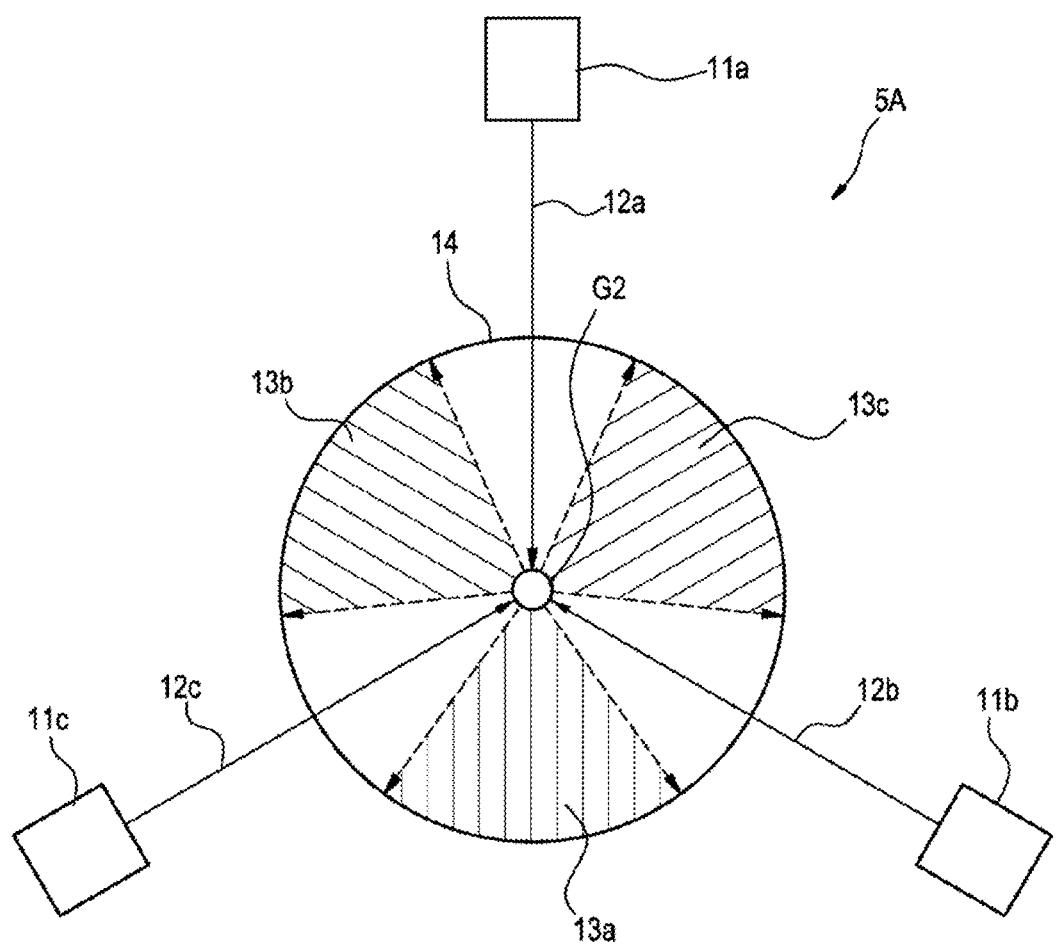
FIG. 2 is a diagram schematically illustrating an optical fiber glass eccentricity measurement device according to a first embodiment.

With reference to FIG. 2, an optical fiber glass eccentricity measurement device 5A according to a first embodiment will be described.

FIG. 2 is a diagram schematically illustrating the glass eccentricity measurement device 5A and is a diagram of the glass eccentricity measurement device 5A viewed from the axial direction of the coated glass fiber G2 in the running line of the optical fiber shown in FIG. 1.

As shown in FIG. 2, the glass eccentricity measurement device 5A includes irradiation units 11a, 11b, and 11c that irradiate a side surface of the coated glass fiber G2 with light (for example, laser light) 12a, 12b, and 12c. Further, the glass eccentricity measurement device 5A includes a screen (an example of a light receiving unit) 14 capable of receiving light 13a, 13b, and 13c scattered and refracted following irradiation of the side surface of the coated glass fiber G2 therewith. The screen 14 is formed, for example, in a cylindrical shape that surrounds the periphery of the coated glass fiber G2 at a predetermined distance from the outer peripheral surface. The light receiving unit is not limited to the screen and may be, for example, a line sensor or a two-dimensional light receiving element such as a CCD or a CMOS.

Around the coated glass fiber G2, a set of measurement members including the irradiation unit 11a and the screen 14 at a position opposite thereto, a set of measurement members including the irradiation unit 11b and the screen 14 at a position opposite thereto, and a set of measurement members including the irradiation unit 11c and the screen 14 at a position opposite thereto are arranged. These three sets of measurement members are respectively arranged, for example, in directions that are equiangular (directions at 120° intervals) on a circumference centered on the coated glass fiber G2.

The light 12a emitted from the irradiation unit 11a is emitted to a side surface of the coated glass fiber G2 and travels as the light 13a refracted and scattered by the glass and coating of the coated glass fiber G2. The light 13a is emitted onto the screen 14 at a position facing the irradiation unit 11a and is displayed as a pattern including a bright portion and a dark portion of the light. Similarly, the light 12b and 12c emitted from the irradiation units 11b and 11c are respectively displayed on the screen opposite thereto as patterns including bright portions and dark portions.

A control unit (not shown) of the glass eccentricity measurement device 5A measures the eccentric amount of the glass fiber G1 with respect to the coating on the coated glass fiber G2 using at least one of the three patterns of brightness and darkness formed on the screen 14.

According to the glass eccentricity measurement device 5A having such a configuration, three sets of measurement members each including an irradiation unit and the screen (light receiving unit) are arranged in directions having different angles on the circumference centered on the coated glass fiber G2. Therefore, even if the light incident from a direction of a certain set is not totally reflected on the glass surface, and the light does not provide a pattern of brightness and darkness required for measuring the eccentric amount of the glass fiber G1, the eccentric amount of the glass fiber G1 can be measured using the patterns of brightness and darkness in the light incident from the directions of the other two sets. Thus, even when the difference between the glass diameter and the coating outer diameter in the optical fiber is small, the eccentric state (eccentric direction and eccentric amount) of the glass can be measured.

When three sets of measurement members each including an irradiation unit and the screen are respectively arranged in directions that are equiangular (directions at 120° intervals) on the circumference centered on the optical fiber, each set can efficiently cover each other so that there is no area where the eccentric amount of the glass fiber G1 cannot be grasped in the coated glass fiber G2.

Second Embodiment

Figure 3A:
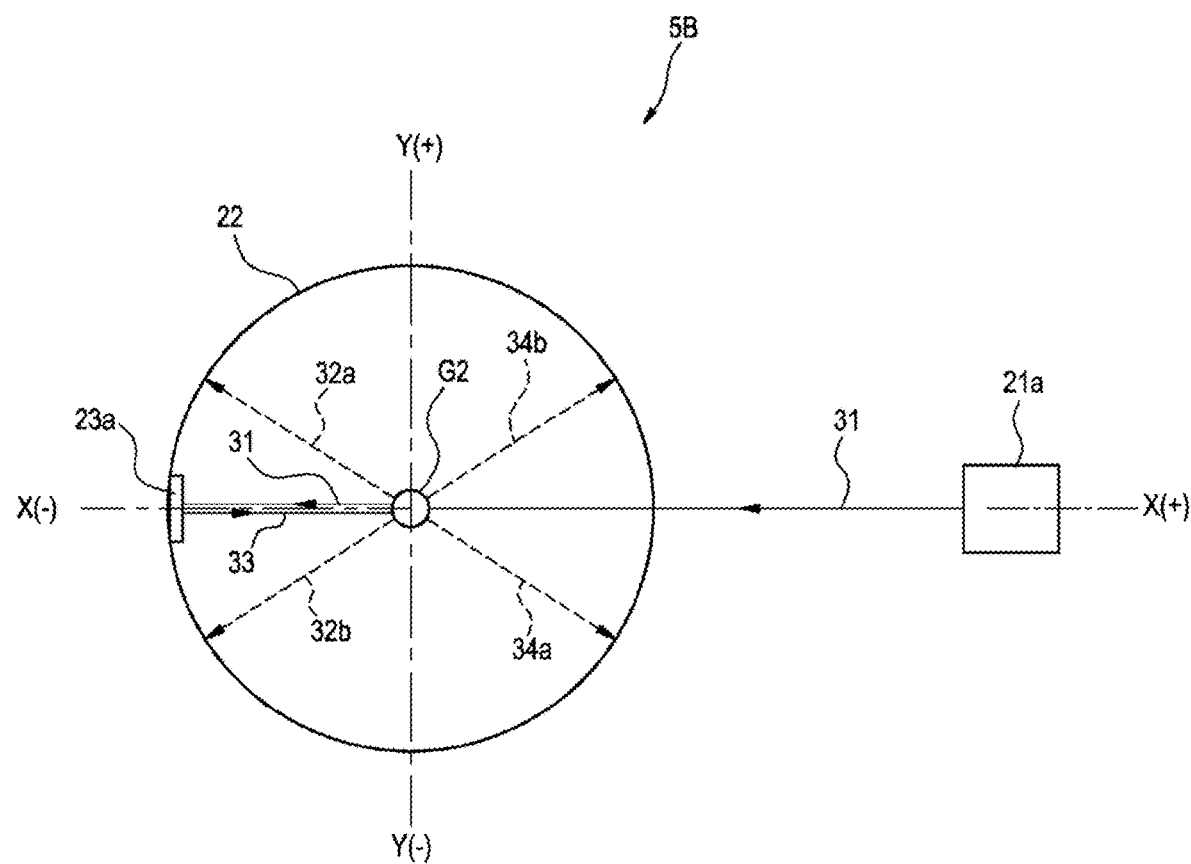
FIG. 3A is a diagram showing a set of measurement members arranged in an X-axis direction in an optical fiber glass eccentricity measurement device according to a second embodiment.
Figure 3B:
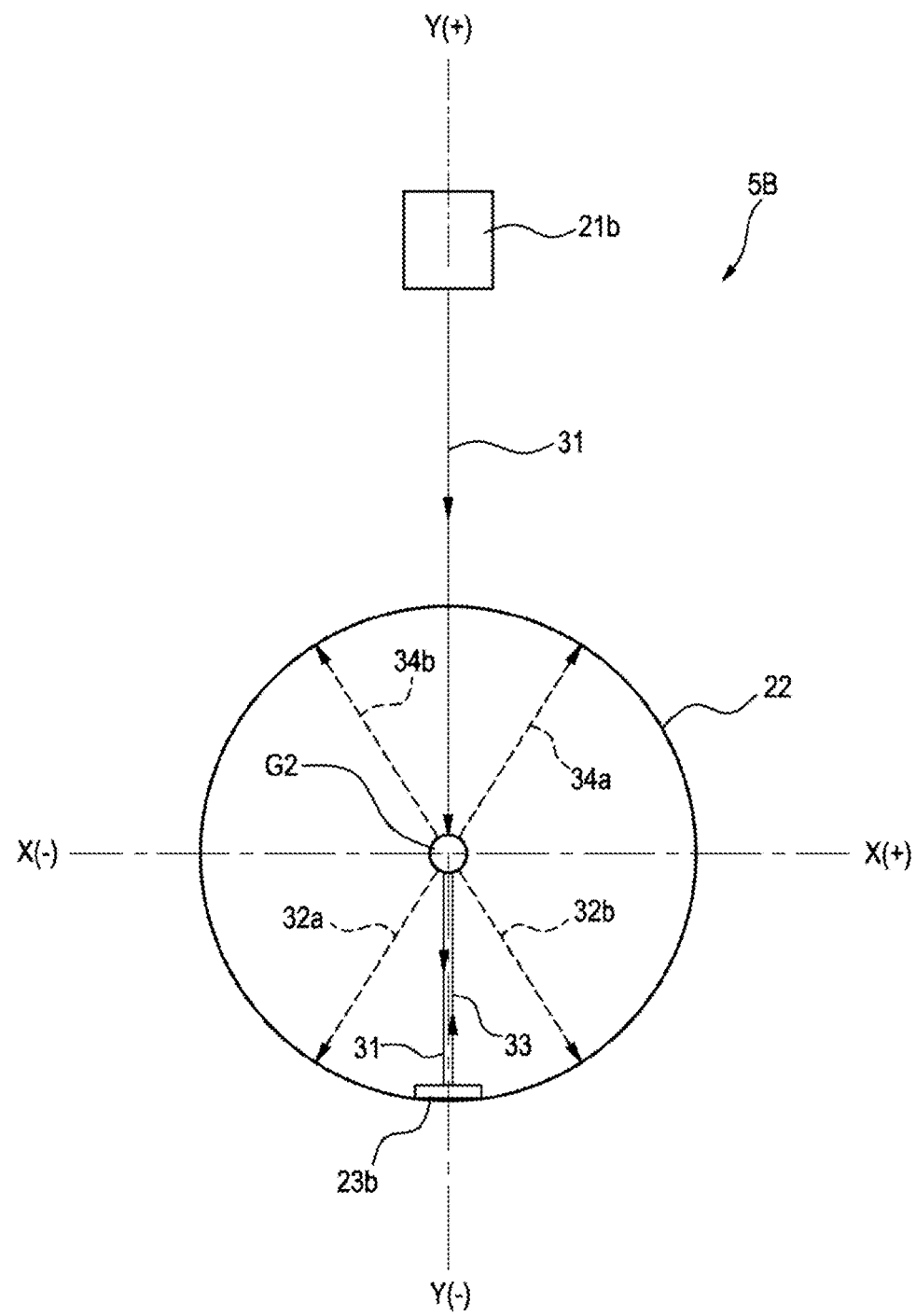
FIG. 3B is a diagram showing a set of measurement members arranged in a Y-axis direction in the optical fiber glass eccentricity measurement device according to the second embodiment.
Figure 4:
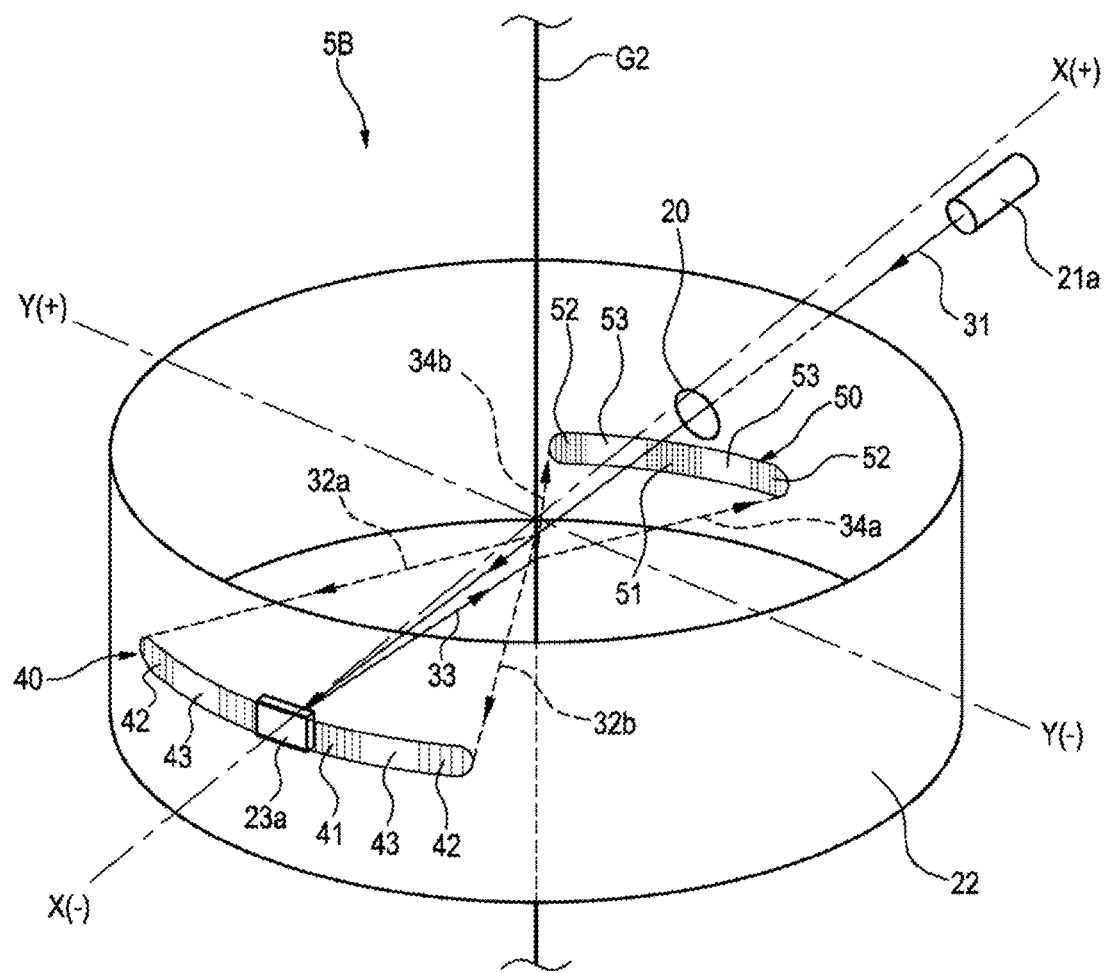
FIG. 4 is a perspective view showing a set of measurement members of FIG. 3A.

With reference to FIGS. 3A, 3B and 4, an optical fiber glass eccentricity measurement device 5B according to a second embodiment will be described.

FIGS. 3A and 3B are diagrams of the glass eccentricity measurement device 5B viewed from the axial direction of the coated glass fiber G2 in the running line of the optical fiber shown in FIG. 1. In order to make the drawing easier to see, the drawings are divided into FIG. 3A showing a set of measurement members arranged in the X-axis direction and FIG. 3B showing a set of measurement members arranged in the Y-axis direction. FIG. 4 is a perspective view of the set of measurement members of FIG. 3A as viewed obliquely from above.

As shown in FIGS. 3A, 3B, and 4, the glass eccentricity measurement device 5B includes light emitting units 21a and 21b, each of which is one of the irradiation units emitting light (for example, laser light) 31 toward the side surface of the coated glass fiber G2. That is, the light emitting units 21a and 21b are arranged in two directions of the X axis and the Y axis in the glass eccentricity measurement device 5B. The Y axis is an axis obtained by rotating the X axis by 90° to the left. In the present embodiment, the direction in which the light emitting unit 21a is arranged is X (+), and the direction in which the light emitting unit 21b is arranged is Y (+).

In addition, the glass eccentricity measurement device 5B includes a screen (an example of a light receiving unit) 22 capable of receiving the light scattered and refracted following irradiation of the side surface of the coated glass fiber G2 therewith. The screen 22 is formed in a cylindrical shape like the screen 14 of the first embodiment.

Further, the glass eccentricity measurement device 5B includes a reflection mirror 23a at a position facing the light emitting unit 21a with the coated glass fiber G2 interposed therebetween and includes a reflection mirror 23b at a position facing the light emitting unit 21b with the coated glass fiber G2 interposed therebetween. The reflection mirrors 23a and 23b are provided on the inner peripheral side of the cylindrical screen 22.

The reflection mirror 23a can reflect the light 31 emitted from the light emitting unit 21a, and functions as one of the irradiation units that can emit the reflected light as irradiation light. Similarly, the reflection mirror 23b can reflect the light 31 emitted from the light emitting unit 21b, and functions as one of the irradiation units, similar to the reflection mirror 23a.

The light reflected by the reflection mirrors 23a and 23b is emitted to the side surface of the coated glass fiber G2 as reflected irradiation light 33, respectively. In the present embodiment, the direction in which the reflection mirror 23a is arranged is X (−), and the direction in which the reflection mirror 23b is arranged is Y (−). The reflection mirrors 23a and 23b may be mirrors to totally reflect light but may be half mirrors. In the case of a half mirror, the position of the fiber with respect to the reflection mirror can be monitored from the back side of the reflection mirror, and thus the task to center the device becomes easier.

As shown in FIG. 4, for example, a part of the light 31 (hereinafter, referred to as direct light) emitted from the light emitting unit 21a through a hole 20 formed in the cylindrical screen 22 is emitted to the side surface of the coated glass fiber G2. As described above, the direct light 31 emitted to the side surface of the coated glass fiber G2 passes through the coated glass fiber G2. The light passing through the coated glass fiber G2 is refracted at the outer peripheral surface of the coating and further refracted at the boundary surface between the glass and the coating. As a result, the light passing through the coated glass fiber G2 is converged like a lens, and the converged light is scattered, and emitted as the light scattered and refracted between an optical path 32a and an optical path 32b to the outside of the coated glass fiber G2. The scattered and refracted light is received by the screen 22 and displayed as a light pattern of brightness and darkness 40.

The pattern of brightness and darkness 40 may include, for example, a pattern of a bright portion 41 caused by the refracted light passing through both the glass and the coating, and a pattern of a bright portion 42 caused by the refracted light passing only through the coating. Further, a pattern of a dark portion 43 is formed between the pattern 41 and the pattern 42 by total reflection at the boundary surface (glass surface) between the glass and the coating.

The reflection mirror 23a is arranged on the screen 22 at a position facing the light emitting unit 21a with respect to the coated glass fiber G2. The direct light 31 emitted from the light emitting unit 21a travels straight toward the screen 22 at the opposing position, and a part thereof is reflected by the reflection mirror 23a. The reflected light becomes irradiation light 33 having the reflection mirror 23a as an irradiation unit, and is emitted onto the side surface of the coated glass fiber G2.

The irradiation light 33 emitted to the coated glass fiber G2 passes through the coated glass fiber G2 as in the case of the direct light 31, and is emitted as the light scattered and refracted between an optical path 34a and an optical path 34b to the outside of the coated glass fiber G2. The scattered and refracted light is received by the screen 22 and displayed as a light pattern of brightness and darkness 50. The pattern of brightness and darkness 50 may include, for example, a pattern of a bright portion 51 caused by the refracted light passing through both the glass and the coating, and a pattern of a bright portion 52 caused by the refracted light passing only through the coating. Further, a pattern of a dark portion 53 is formed between the pattern 51 and the pattern 52 by total reflection on the glass surface.

A control unit (not shown) of the glass eccentricity measurement device 5B measures the eccentric amount of the glass fiber G1 with respect to the coating on the coated glass fiber G2 in the Y-axis direction (Y (+) direction or Y (−) direction) based on at least one of the pattern of brightness and darkness 40 and the pattern of brightness and darkness 50 formed on the screen 22.

Although FIG. 4 shows only the patterns of brightness and darkness 40 and 50 formed on the screen 22 by the light emitted from the light emitting unit 21a, patterns of brightness and darkness are similarly formed by the light emitted from the light emitting unit 21b on the screen 22 in the Y (+) direction and the Y (−) direction. The control unit of the glass eccentricity measurement device 5B measures the eccentric amount of the glass fiber G1 with respect to the coating on the coated glass fiber G2 in the X-axis direction (X (+) direction or X (−) direction) based on these patterns of brightness and darkness.

As described above, around the coated glass fiber G2, in the X-axis direction, a set of measurement members including the light emitting unit 21a and the screen 22 at a position opposite thereto, and a set of measurement members including the reflection mirror 23a as an irradiation unit and the screen 22 at a position opposite thereto are arranged. Further, in the Y-axis direction, a set of measurement members including the light emitting unit 21b and the screen 22 at a position opposite thereto, and a set of measurement members including the reflection mirror 23b as an irradiation unit and the screen 22 at a position opposite thereto are arranged. These four sets of measurement members are respectively arranged in directions that are equiangular (directions at 90° intervals) on the circumference centered on the coated glass fiber G2. In the present embodiment, the reflection mirrors 23a and 23b function as the irradiation unit. However, instead of using these reflection mirrors, four light emitting units that can emit direct light may be arranged. Further, instead of the reflection mirror, a cylindrical reflection unit described later may be used.

Third Embodiment

Figure 5A:
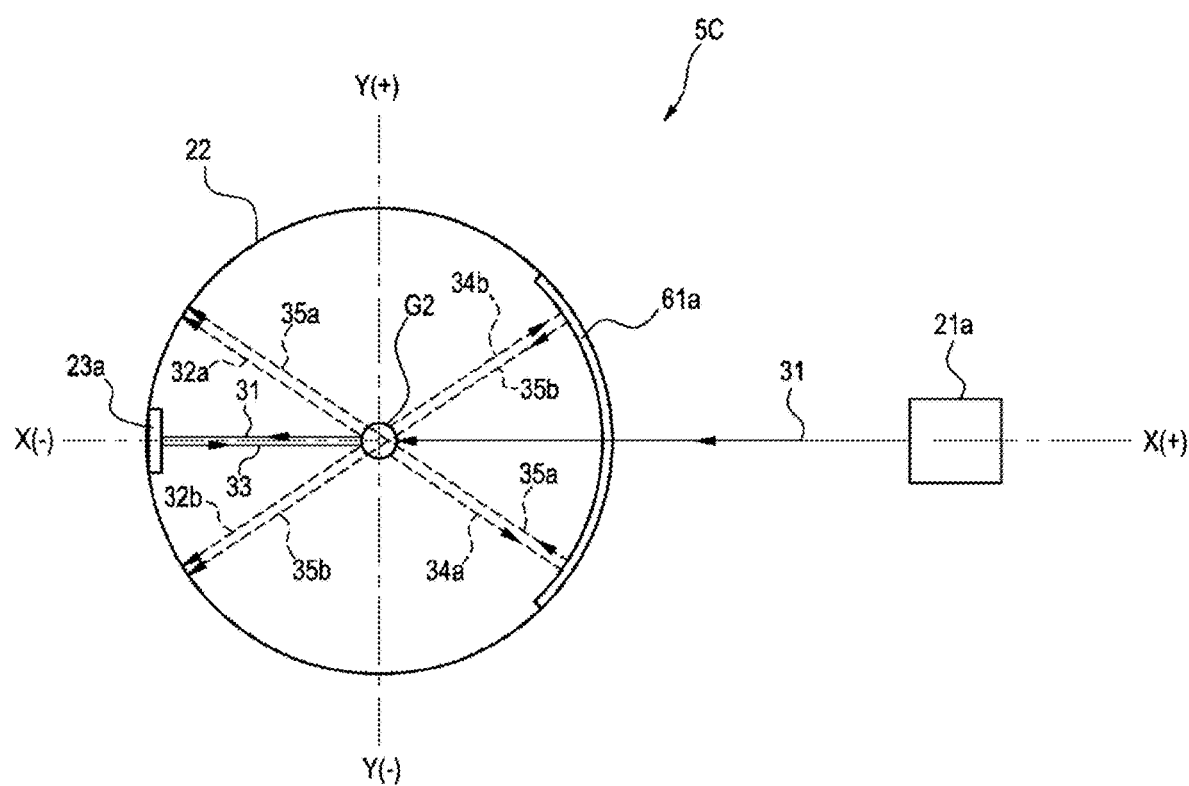
FIG. 5A is a diagram showing a set of measurement members arranged in the X-axis direction in an optical fiber glass eccentricity measurement device according to a third embodiment.
Figure 5B:
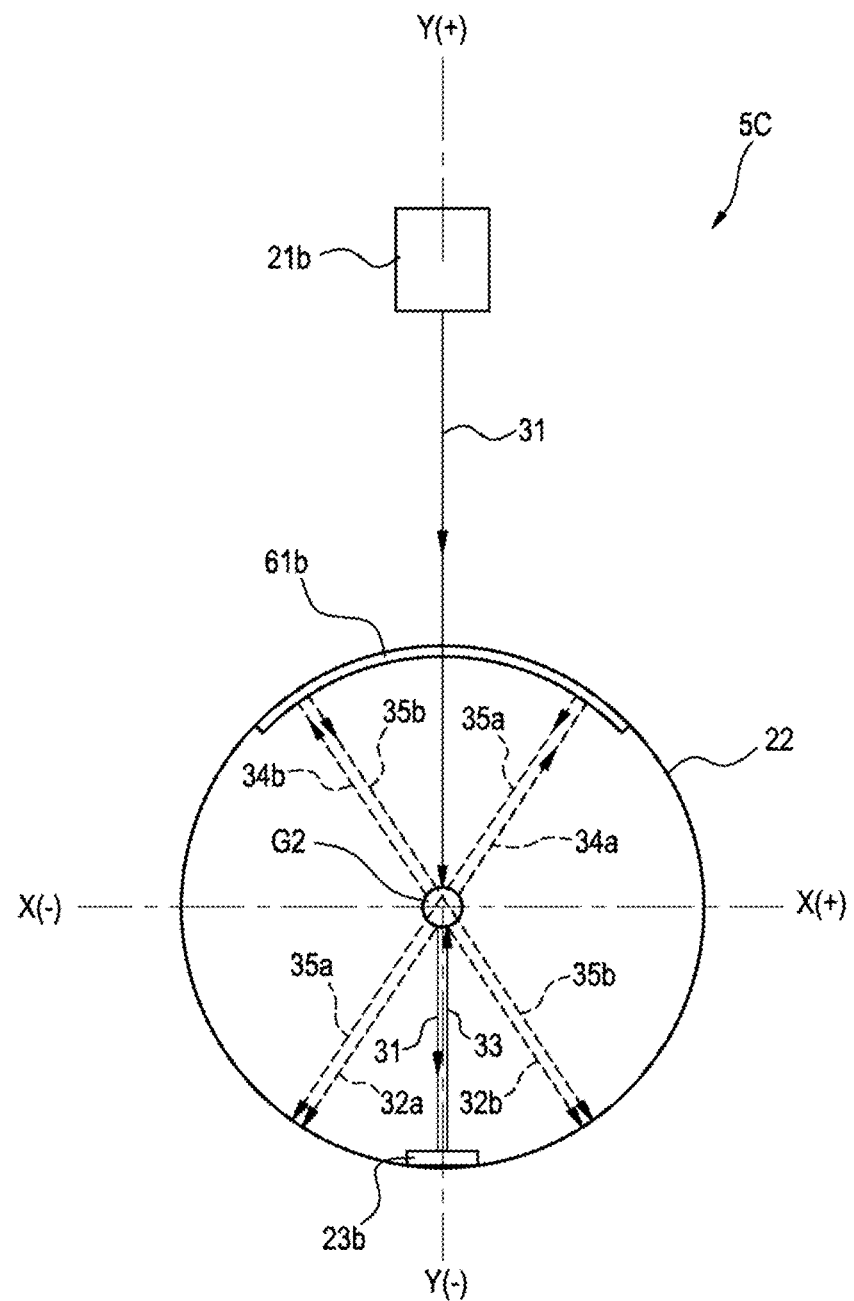
FIG. 5B is a diagram showing a set of measurement members arranged in the Y-axis direction in the optical fiber glass eccentricity measurement device according to the third embodiment.
Figure 6:
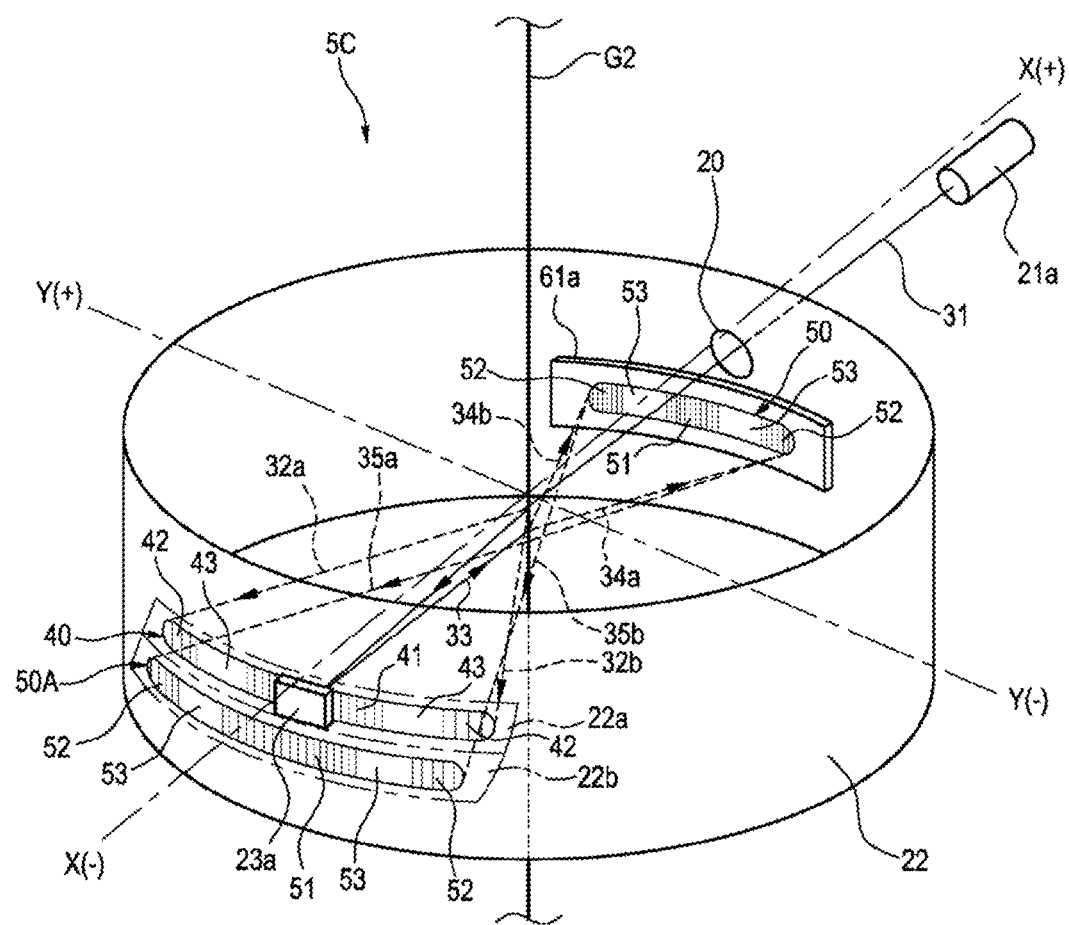
FIG. 6 is a perspective view showing a set of measurement members of FIG. 5A.

With reference to FIGS. 5A, 5B, and 6, an optical fiber glass eccentricity measurement device 5C according to a third embodiment will be described.

FIGS. 5A and 5B are diagrams of the glass eccentricity measurement device 5C viewed from the axial direction of the coated glass fiber G2 in the running line of the optical fiber shown in FIG. 1. As in the above-described second embodiment, in order to make the drawing easier to see, the drawing is divided into FIG. 5A showing a set of measurement members arranged in the X-axis direction, and FIG. 5B showing a set of measurement members arranged in the Y-axis direction. FIG. 6 is a perspective view of the set of measurement members of FIG. 5A as viewed obliquely from above.

The same components as those of the glass eccentricity measurement device 5B according to the second embodiment are denoted by the same reference numerals, and the description thereof will be omitted as appropriate.

As shown in FIGS. 5A, 5B and 6, the glass eccentricity measurement device 5C includes an arc-shaped arc mirror 61a (an example of a reflection unit) at a position facing the reflection mirror 23a, with the coated glass fiber G2 interposed therebetween, and includes an arc-shaped arc mirror 61b (an example of a reflection unit) at a position facing the reflection mirror 23*b*. The arc mirrors 61*a* and 61*b* are provided inside the cylindrical screen 22 along the inner periphery of the screen 22.

The arc mirror 61*a* can reflect the light scattered and refracted (pattern of brightness and darkness formed by scattered light and refracted light), which has been reflected by the reflection mirror 23*a* and emitted to the side surface of the coated glass fiber G2. Similarly, the arc mirror 61*b* can reflect the light scattered and refracted, which has been reflected by the reflection mirror 23*b* and emitted to the side surface of the coated glass fiber G2.

As shown in FIG. 6, the direct light 31 emitted from the light emitting unit 21*a* is refracted by the glass and the coating of the coated glass fiber G2 and displayed as a pattern of brightness and darkness 40 on the screen 22, as in the case of the above-described second embodiment. The light reflected by the reflection mirror 23*a* becomes the irradiation light 33 having the reflection mirror 23*a* as an irradiation unit and is emitted to the side surface of the coated glass fiber G2. As in the case of the above-described second embodiment, the irradiation light 33 passes through the coated glass fiber G2 and is scattered and refracted between the optical path 34*a* and the optical path 34*b* to the outside of the coated glass fiber G2, and then is emitted to the arc mirror 61*a* as the light of the pattern of brightness and darkness 50.

The light of the pattern of brightness and darkness 50 is further reflected by the arc mirror 61*a*, travels toward the screen 22 at an opposing position between an optical path 35*a* and an optical path 35*b*, is received by the screen 22, and is displayed as a pattern of brightness and darkness 50A. The pattern of brightness and darkness 50A is displayed side by side along with the pattern of brightness and darkness 40 in the axial direction of the coated glass fiber G2 (vertical direction in FIG. 6) in the area of the cylindrical screen 22 in the same direction.

The pattern of brightness and darkness 40 and the pattern of brightness and darkness 50A on the screen 22 can be displayed at predetermined positions by adjusting the inclination angles of the reflection mirror 23*a* and the arc mirror 61*a*.

In the present embodiment, a lower display area (an example of a first light receiving unit) 22*a* and an upper display area (an example of a second light receiving unit) 22*b* are arranged side by side along the axial direction of the coated glass fiber G2 at the same angular position on the circumference of the screen 22. Then, the pattern of brightness and darkness 40 is displayed in the lower display area 22*a*, and the pattern of brightness and darkness 50A is displayed in the upper display area 22*b*. In the pattern of brightness and darkness 50A, the patterns 51 to 53 of the pattern of brightness and darkness 50 reflected by the arc mirror 61*a* are formed by inverting left and right.

The control unit (not shown) of the glass eccentricity measurement device 5C measures the eccentric amount of the glass fiber G1 with respect to the coating on the coated glass fiber G2 in the Y-axis direction (Y (+) direction or Y (−) direction) based on at least one of the pattern of brightness and darkness 40 and the pattern of brightness and darkness 50A formed on the screen 22.

Although FIG. 6 shows only the patterns of brightness and darkness 40 and 50A formed on the screen 22 by the light emitted from the light emitting unit 21*a*, patterns of brightness and darkness are similarly formed by the light emitted from the light emitting unit 21*b* on the screen 22 in the Y (−) direction. The control unit of the glass eccentricity measurement device 5C measures the eccentric amount of the glass fiber G1 with respect to the coating on the coated glass fiber G2 in the X-axis direction (X (+) direction or X (−) direction) based on these patterns of brightness and darkness.

Figure 7:
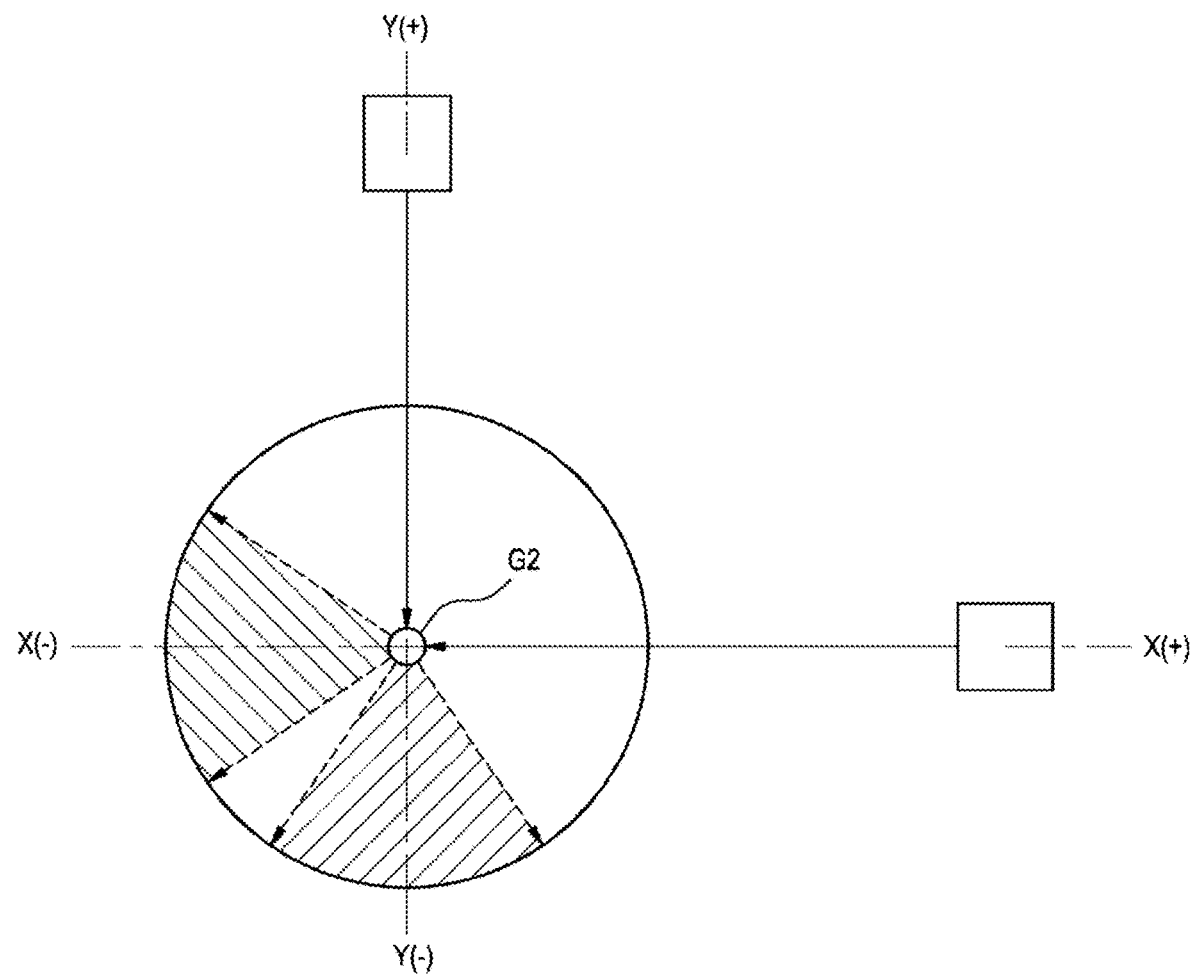
FIG. 7 is a diagram schematically illustrating an optical fiber glass eccentricity measurement device of the related art.
Figure 8:
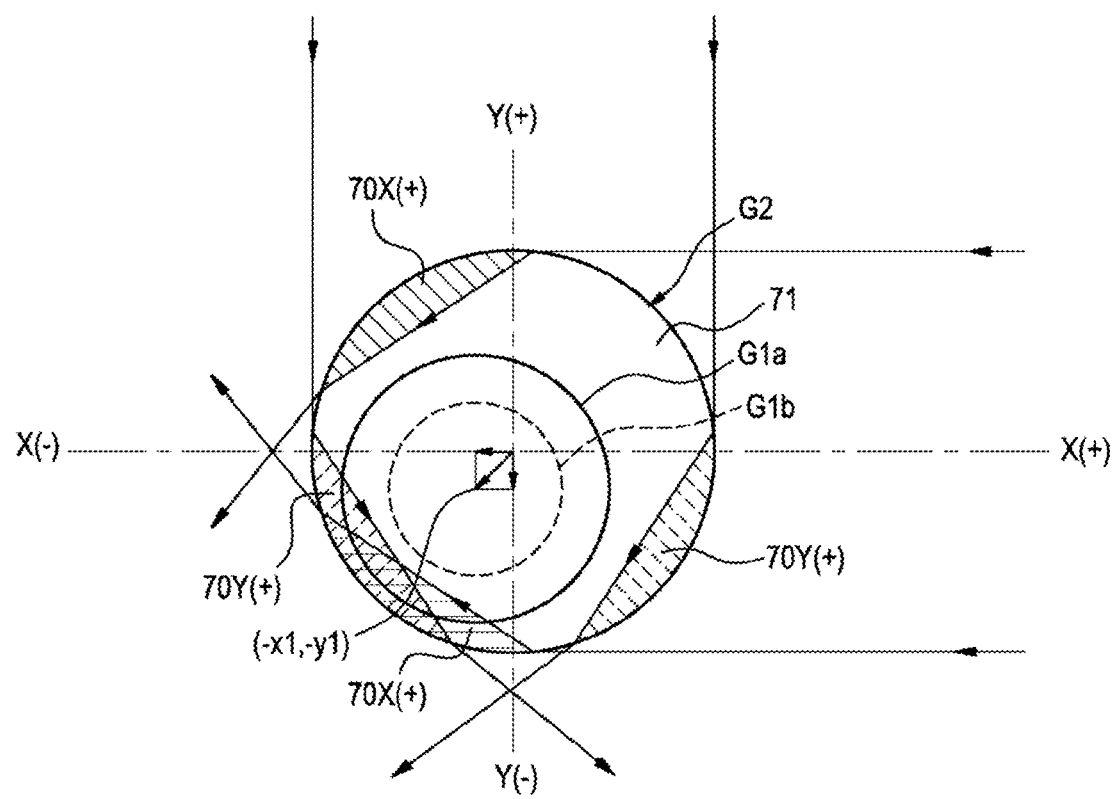
FIG. 8 is a diagram showing how the light incident on a coated glass fiber is refracted in the glass eccentricity measurement device of FIG. 7.

Next, for comparison, a glass eccentricity measurement device of the related art that irradiates the side surface of the coated glass fiber G2 with light from two directions will be described with reference to FIGS. 7 and 8. FIG. 7 is a diagram schematically illustrating a glass eccentricity measurement device of the related art. FIG. 8 is a diagram showing how light incident on the coated glass fiber G2 is refracted.

As shown in FIG. 7, in the glass eccentricity measurement device of the related art, the coated glass fiber G2 is irradiated with light from two directions (X (+) and Y (+) directions) perpendicular to each other.

Light incident on the coated glass fiber G2 from the X (+) direction is refracted as shown in FIG. 8 and travels in the X (−) direction. At this time, the light is refracted inside the coated glass fiber G2, so that a blank area 70X (+) (a hatched area shown in FIG. 8) through which the light from X (+) does not pass is generated. This blank area is an area where a pattern of brightness and darkness to be displayed on the opposing screen is not formed. Similarly, in the case of light incident on the coated glass fiber G2 from the Y (+) direction, as shown in FIG. 8, a blank area 70Y (+) through which the light from Y (+) does not pass (a hatched area shown in FIG. 8) is generated.

Next, the measurement of the eccentric amount of the glass fiber in the glass eccentricity measurement device of the related art will be described, as shown in FIG. 8, with an example in which the eccentric amounts of two glass fibers (G1*a* and G1*b*) having the same coating diameters but different outer diameters are measured. FIG. 8 shows a case where the outer diameter of the glass fiber is small (G1*a*) and a case where the outer diameter of the glass fiber is large (G1*b*).

In this example, it is assumed that the eccentric amount of the glass fiber G1*a* and the eccentric amount of the glass fiber G1*b* with respect to the coating 71 are both (−x1 and −y1). The glass fiber G1*a* is a glass fiber having a larger outer diameter than the glass fiber G1*b*. In other words, the thickness of the coating 71 on the glass fiber G1*a* is thinner than the thickness of the coating 71 on the glass fiber G1*b*.

In this case, the glass fiber G1*b* having a small outer diameter does not cover the blank area 70X (+) nor the blank area 70Y (+). Therefore, the eccentric amount (−x1) of the glass fiber G1*b* can be measured by the light from the Y (+) direction. Further, the eccentric amount (−y1) of the glass fiber G1*b* can be measured by the light from the X (+) direction.

On the other hand, the glass fiber G1*a* having a large outer diameter covers the blank area 70Y (+) and the blank area 70X (+). Therefore, in the portion covering the blank area 70X (+), the light from the X (+) direction is not totally reflected on the glass surface, and the pattern of a dark portion is not displayed in the pattern of brightness and darkness on the screen. Further, in the portion covering the blank area 70Y (+), the light from the Y (+) direction is not totally reflected on the glass surface, and the pattern of a dark portion is not displayed in the pattern of brightness and darkness on the screen. As a result, the eccentric amounts (−x1) and (−y1) of the glass fiber G1*a* cannot be measured.

Therefore, when light is emitted from two directions, the eccentric amounts (−x1 and −y1) of the glass fiber G1*b* can be measured, but the eccentric amounts (−x1 and −y1) of the glass fiber G1*a* cannot be measured. That is, in the glass eccentricity measurement device of the related art that emits light from two directions, when the difference between the glass diameter and the coating outer diameter becomes small (when the coating thickness becomes small) as in the case of the glass fiber G1a described above, the eccentric state (eccentric direction and eccentric amount) of the glass cannot be measured.

Figure 9:
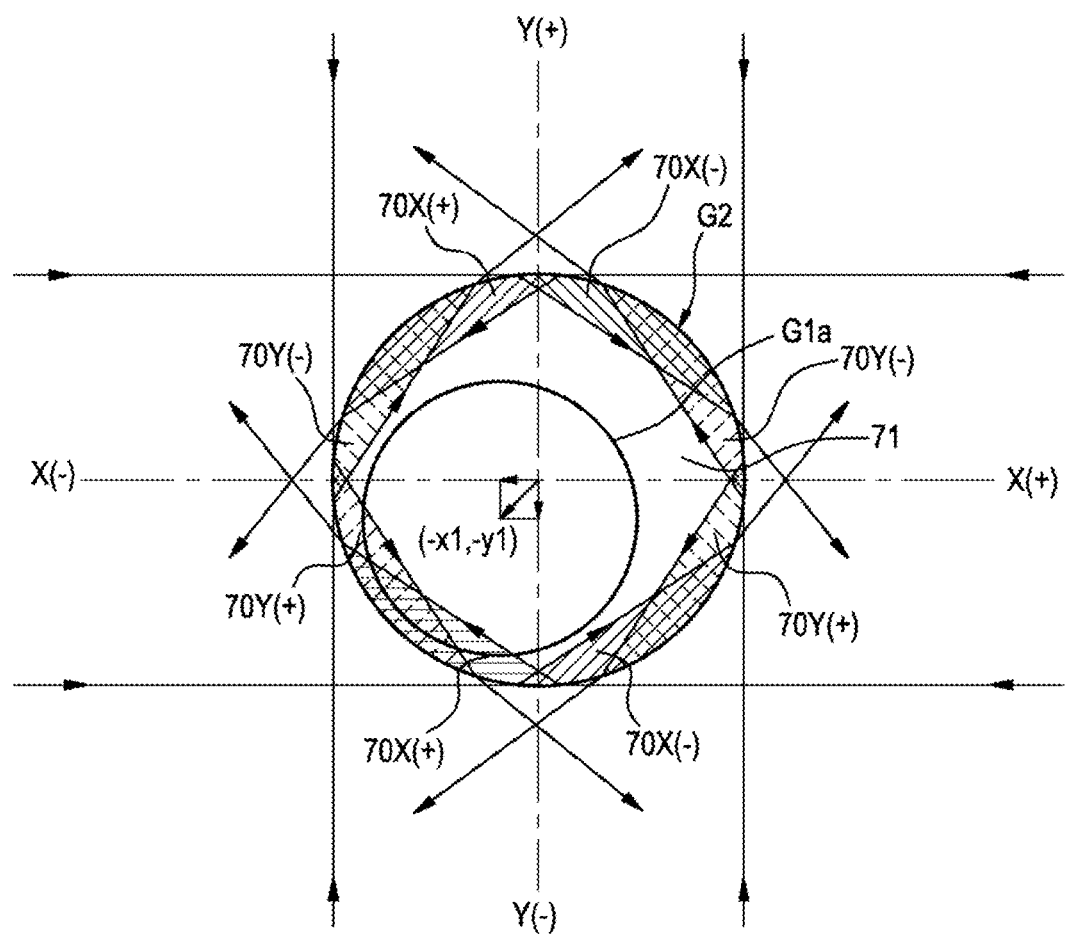
FIG. 9 is a diagram showing how the light incident on the coated glass fiber is refracted in the glass eccentricity measurement device of the second embodiment and the glass eccentricity measurement device of the third embodiment.

On the other hand, the case of the glass eccentricity measurement device 5B of the second embodiment and the glass eccentricity measurement device 5C of the third embodiment, which irradiate the side surface of the coated glass fiber G2 with light from four directions, becomes as shown in FIG. 9. FIG. 9 shows how the coated glass fiber G2 is irradiated with light from four directions of X (+), X (−), Y (+), and Y (−), and the light incident on the coated glass fiber G2 from the four directions is refracted.

Also in this example, it is assumed that the eccentric amount of the glass fiber G1a with respect to the coating 71 is (−x1 and −y1). The outer diameter of the coating 71 and the outer diameter of the glass fiber G1a are the same as the respective outer diameters described with reference to FIG. 8.

In this case, the glass fiber G1a does not cover the blank area 70Y (−) nor the blank area 70X (−). Therefore, the eccentric amount (−x1) of the glass fiber G1a can be measured by the light from the Y (−) direction, and the eccentric amount (−y1) of the glass fiber G1a can be measured by the light from the X (−) direction. Therefore, the eccentric amounts (−x1 and −y1) of the glass fiber G1a can be measured by emitting light from four directions.

As described above, according to the glass eccentricity measurement device 5B and the glass eccentricity measurement device 5C, the sets each including the irradiation unit and the screen (light receiving unit) are respectively arranged in the X (+) and X (−) directions, and the Y (+) and Y (−) directions on the circumference centered on the coated glass fiber G2. Therefore, even if a pattern of brightness and darkness does not occur in the pattern of the light received in a certain direction, the eccentric amount of the glass fiber G1 with respect to the coating can be measured from the patterns of brightness and darkness in the light received respectively in at least the other two or more directions. Therefore, even when the difference between the glass diameter and the coating outer diameter is small due to the reduction in the diameter of the optical fiber or the like, the eccentric state (eccentric direction and eccentric amount) of the glass can be measured.

Further, since the sets each including an irradiation unit and the screen is arranged in directions that are equiangular on the circumference centered on the coated glass fiber G2, the sets can be efficiently covered so that an area where the eccentric state cannot be grasped does not occur.

Further, since the reflection mirrors 23a and 23b functioning as one of the irradiation units are provided at positions facing the light emitting unit which is one of the irradiation units, even when the number of the sets each including the irradiation unit and the screen is four, the number of light emitting units can be reduced. Thus, the cost of the glass eccentricity measurement devices 5B and 5C can be reduced.

Further, according to the glass eccentricity measurement device 5C, since the pattern of brightness and darkness 40 and the pattern of brightness and darkness 50A are respectively displayed in the lower display area 22a and the upper display area 22b which are arranged side by side along the axial direction of the coated glass fiber G2 at the same angular position on the circumference of the screen 22, the patterns of brightness and darkness can be easily compared.

(Glass Eccentricity Measurement Method)

Next, an optical fiber glass eccentricity measurement method by the optical fiber glass eccentricity measurement device 5A according to the first embodiment will be described with reference to FIG. 2.

Toward the side surface of the coated glass fiber G2 in which the coating is applied around the striated glass fiber G1, for example, as shown in FIG. 2, light is emitted from the irradiation units arranged in three or more directions having different angles on the circumference centered on the coated glass fiber G2 (an example of an irradiation step). For example, as shown in FIG. 2, the irradiation units 11a, 11b, and 11c are arranged respectively in directions that are equiangular on the circumference.

The light emitted to the side surface of the coated glass fiber G2, scattered and refracted by passing through the coated glass fiber G2 is received by a part of the screen 14 arranged at positions facing each irradiation unit (an example of a light receiving step).

The eccentric state (eccentric direction and eccentric amount) of the glass fiber G1 with respect to the coating on the coated glass fiber G2 is measured based on the pattern of brightness and darkness in the light received by the screen 14 (an example of a measurement step).

According to such an optical fiber glass eccentricity measurement method, even if the pattern of brightness and darkness in the light received in one direction disappears, the eccentric state of the glass fiber G1 can be determined from the patterns of brightness and darkness in the light received in other directions. Thus, the eccentric state of the glass can be detected even when the difference between the glass diameter and the coating outer diameter is small due to the reduction in the diameter of the optical fiber.

Next, a glass eccentricity measurement method using the optical fiber glass eccentricity measurement device 5B according to the second embodiment will be described with reference to FIGS. 3A, 3B, and 4 (Irradiation step).

For example, as shown in FIGS. 3A, 3B and 4, the side surface of the coated glass fiber G2 is irradiated with light respectively from the two light emitting units 21a and 21b arranged in directions having different angles on the circumference centered on the coated glass fiber G2. A part of the emitted light is reflected by two reflection mirrors 23a and 23b arranged at positions facing the two light emitting units 21a and 21b, respectively. By irradiating the side surface of the coated glass fiber G2 with the reflected light from the two directions reflected by the two reflection mirrors 23a and 23b as refracted irradiation light, the side surface of the coated glass fiber G2 is irradiated with the light from four directions.

(Light Receiving Step)

The light scattered and refracted following irradiation of the side surface of the coated glass fiber G2 therewith from four directions is received by a part of the screen 22 arranged at the opposing positions.

According to such an optical fiber glass eccentricity measurement method, the side surfaces of the coated glass fiber G2 can be irradiated with light by making the reflection mirrors 23a and 23b arranged at positions facing the light emitting units 21a and 21b function as irradiation units. Therefore, by using the two light emitting units 21a and 21b, the side surface of the coated glass fiber G2 can be irradiated with light from four directions, so that the cost of the glass eccentricity measurement device can be reduced. Instead of using these reflection mirrors, four light emitting units that can emit direct light may be arranged. Further, instead of the reflection mirror, a cylindrical reflection unit may be used.

Next, a glass eccentricity measurement method using the optical fiber glass eccentricity measurement device 5C according to the third embodiment will be described with reference to FIGS. 5A, 5B and 6 (Irradiation step).

For example, as shown in FIGS. 5A, 5B and 6, the side surface of the coated glass fiber G2 is irradiated with light from two light emitting units 21a and 21b arranged in directions having different angles on the circumference centered on the coated glass fiber G2. A part of the light that does not hit the side surface of the coated glass fiber G2 is reflected by two reflection mirrors 23a and 23b arranged at positions facing the two light emitting units 21a and 21b, respectively. The side surface of the coated glass fiber G2 is irradiated with the light reflected from the two directions reflected by the two reflection mirrors 23a and 23b. The light scattered and refracted following the irradiation is further reflected by the two arc-shaped arc mirrors 61a and 61b respectively arranged along the circumference centered on the coated glass fiber G2 at positions facing the two reflection mirrors 23a and 23b on the circumference centered on the coated glass fiber G2.

(Light Receiving Step)

The light scattered and refracted following direct irradiation of the side surface of the coated glass fiber G2 therewith from the two light emitting portions 21a and 21b is received by the lower display area 22a of the screen 22 at positions respectively facing the two light emitting units 21a and 21b. The light further reflected by the two arc mirrors 61a and 61b is received by the upper display area 22b of the screen 22 at positions respectively facing the two arc mirrors 61a and 61b. The lower display area 22a and the upper display area 22b corresponding to the respective light emitting units are arranged side by side along the axial direction of the coated glass fiber G2 at the same angular position on the circumference centered on the coated glass fiber G2.

According to such an optical fiber glass eccentricity measurement method, two lower display areas 22a which respectively receive the light scattered and refracted following direct irradiation of the side surface of the coated glass fiber G2 therewith from the two light emitting units 21a and 21b, and two upper display areas 22b which respectively receive the light further reflected by the two arc mirrors 61a and 61b are arranged side by side along the axial direction of the coated glass fiber G2 at the same angular position on the circumference centered on the coated glass fiber G2. Therefore, the patterns of brightness and darkness in the two rays of received light can be easily compared.

While the present disclosure has been described in detail and with reference to specific embodiments, it will be apparent to those skilled in the art that various changes and modifications can be made without departing from the spirit and scope of the present disclosure. Further, the number, position, shape, and the like of the constituent members described above are not limited to the above-described embodiment and can be changed to numbers, positions, shapes, and the like suitable for implementing the present disclosure.

REFERENCE SIGNS LIST 5, 5A, 5B, 5C: Glass eccentricity measurement device
11a to 11c: Irradiation unit
12a to 12c: Light (emitted light)
13a to 13c: Light (scattered and refracted light)
14, 22: Screen (an example of a light receiving unit)
21a, 21b: Light emitting unit (an example of an irradiation unit)
23a, 23b: Reflection mirror (an example of an irradiation unit)
31: Light (direct light)
32a, 32b, 34a, 34b, 35a, 35b: Optical path
33: Irradiation light (irradiation light with the reflection mirror as the irradiation unit)
40, 50, 50A: Pattern of brightness and darkness
41 to 43, 51 to 53: Pattern
61a, 61b: Arc mirror (an example of a reflection unit)
22a: Lower display area (an example of a first light receiving unit)
22b: Upper display area (an example of a second light receiving unit)
70X (+), 70X (−), 70Y (−), 70Y (+): Blank area
100: Optical fiber manufacturing apparatus
G: Optical fiber base material
G1: Glass fiber
G2: Coated glass fiber
G3: Optical fiber

The invention claimed is:

1. An optical fiber glass eccentricity measurement device comprising:
  an irradiation unit that irradiates with light a side surface of an optical fiber with a coating layer on a striated glass; and
  a light receiving unit that receives light scattered and/or refracted following irradiation of the side surface of the optical fiber therewith,
  the glass eccentricity measurement device for measuring the eccentricity of the glass in the optical fiber based on patterns of brightness and darkness in the light received by the light receiving unit, wherein
  three or more sets each including the irradiation unit and the light receiving unit are provided around the optical fiber,
  the sets are respectively arranged in directions having different angles on a circumference centered on the optical fiber, and
  a first irradiation unit and a second irradiation unit, each of which is one of the irradiation units in the three or more sets, are arranged at positions facing each other with the optical fiber interposed therebetween.

2. The optical fiber glass eccentricity measurement device according to claim 1, wherein
  the sets are arranged in directions that are equiangular on the circumference centered on the optical fiber.

3. The optical fiber glass eccentricity measurement device according to claim 1, wherein
  the first irradiation unit and the second irradiation unit are each a light emitting unit.

4. The optical fiber glass eccentricity measurement device according to claim 1, wherein
  the first irradiation unit is a light emitting unit, and
  the second irradiation unit is a reflection mirror that reflects the light emitted from the light emitting unit, wherein the light reflected by the reflection mirror is used as irradiation light and a side surface of the optical fiber is irradiated with the irradiation light.

5. The optical fiber glass eccentricity measurement device according to claim 3, further comprising:
  an arc-shaped reflection unit along the circumference centered on the optical fiber at a position facing the second irradiation unit on the circumference centered on the optical fiber, wherein a first light receiving unit and a second light receiving unit, each of which is one of the light receiving units, are arranged side by side along the axial direction of the optical fiber at the same angular position on the circumference centered on the optical fiber, the first light receiving unit is a light receiving unit that receives the light scattered and/or refracted following direct irradiation of the side surface of the optical fiber therewith from the first irradiation unit, and the second light receiving unit is a light receiving unit that receives the light scattered and/or refracted following irradiation of the side surface of the optical fiber with the irradiation light by the second irradiation unit, and then further reflected by the reflection unit.

6. An optical fiber glass eccentricity measurement method, comprising:

an irradiation step of irradiating a side surface of an optical fiber including a coating layer coated on a striated glass with light from four directions having different angles on a circumference centered on the optical fiber;

a light receiving step of receiving the light scattered and/or refracted following irradiation of the side surface of the optical fiber therewith from the three or more directions; and a measuring step of measuring an eccentricity of the glass in the optical fiber based on a pattern of brightness and darkness in the received light, wherein the irradiation step includes irradiating the side surface of the optical fiber with light respectively from two first irradiation units and two second irradiation units, the two first irradiation units are arranged in directions having different angles on the circumference centered on the optical fiber, and the two second irradiation units are arranged at positions facing each other with the optical fiber interposed therebetween.

7. The optical fiber glass eccentricity measurement method according to claim 6, wherein in the irradiation step, the light is emitted from three or more directions that are equiangular on the circumference centered on the optical fiber.

8. The optical fiber glass eccentricity measurement method according to claim 6, wherein the two first irradiation units and the two second irradiation units are each a light emitting unit, and in the light receiving step, the light scattered and/or refracted following irradiation of the side surface of the optical fiber therewith from the four directions are received.

9. The optical fiber glass eccentricity measurement method according to claim 6, wherein the two first irradiation units are each a light emitting unit, the two second irradiation units are each a reflection mirror that reflects the light emitted from a respective one of the light emitting units, and in the light receiving step, the light scattered and/or refracted following irradiation of the side surface of the optical fiber therewith from the four directions are received.

10. The optical fiber glass eccentricity measurement method according to claim 8, wherein in the light receiving step, light is received respectively by two first light receiving units that respectively receive the light scattered and/or refracted following direct irradiation of the side surface of the optical fiber therewith from the two first irradiation units, and two second light receiving units that respectively receive the light scattered and/or refracted following direct irradiation of the side surface of the optical fiber therewith from the two second irradiation units, and further reflected by two arc-shaped reflection units which are respectively arranged at positions facing the second irradiation units on the circumference centered on the optical fiber and are along the circumference centered on the optical fiber, and the first light receiving unit and the second light receiving unit are arranged side by side along the axial direction of the optical fiber at the same angular position on the circumference centered on the optical fiber.

* * * * *